(12) United States Patent
Takahashi et al.

(10) Patent No.: US 6,194,676 B1
(45) Date of Patent: Feb. 27, 2001

(54) TURN SIGNAL SWITCH DEVICE

(75) Inventors: Atsuo Takahashi; Yasuo Takii, both of Miyagi-ken (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/594,546

(22) Filed: Jun. 14, 2000

(30) Foreign Application Priority Data

Jun. 16, 1999 (JP) .................................................. 11-169793

(51) Int. Cl.⁷ .................................................. H01H 25/00
(52) U.S. Cl. .................. 200/61.34; 200/61.3; 200/61.35
(58) Field of Search .............................. 200/62.27, 61.3, 200/61.31, 61.32, 61.35, 61.36, 61.54, 4, 332, 335, 61.34

(56) References Cited

U.S. PATENT DOCUMENTS

| | | | |
|---|---|---|---|
| 5,949,040 | 9/1999 | Hayakawa et al. | 200/61.34 |
| 5,994,653 | * 11/1999 | Poleshuk et al. | 200/61.3 |
| 6,069,329 | * 5/2000 | Weiss et al. | 200/61.3 |

* cited by examiner

*Primary Examiner*—Michael Friedhofer
(74) *Attorney, Agent, or Firm*—Brinks Hofer Gilson & Lione

(57) ABSTRACT

A mechanism for releasing an excess load with a simple construction when the excess load is applied during a cancel operation for automatically restoring an operating lever. A movable member is swingably supported by a holder mounted to an operating lever, and a spring is provided between the movable member and a driving member, whereby the movable member is biased toward the stable position of the holder, and the driving member is brought into press contact with a cam surface of a case. When the operating lever is rotated from the neutral position to the operating position, the driving member slides on the cam surface and is held in the operating position, and a first lever member comes into the rotation path of a cancel protrusion. When in this condition the steering wheel is turned in the opposite direction, the cancel protrusion abuts the first lever member to rotate during the return operation thereof, and with that, a second lever member rotates. As a result, the periphery of an opening of the second lever member pressurizes a receiving portion of the movable member, and due to this pressurizing force, the operating lever is automatically restored to the neutral position.

12 Claims, 10 Drawing Sheets

TURN SIGNAL SWITCH DEVICE

BACKGROUND OF THE INVENTION

1. Field of the Invention

The present invention relates to a turn signal switch device attached to a steering column or the like of an automobile and serving as a direction indicator and, more specifically, it relates to a mechanism for releasing an excess load when, in a cancel operation for automatically restoring an operating lever provided in the turn signal switch device from an operating position to a neutral position, a force preventing the automatic restoring is applied to the operating lever.

2. Description of the Related Art

In the turn signal switch device of an automobile, the base end of an operating lever is rotatably supported by a housing integrally formed with the steering column or the like, and the forward end of this operating lever is rotated from a neutral position to a right or left direction indicating position, whereby a right-turn or left-turn lamp is caused to blink. In such a turn signal switch device, to retain the operating lever at three positions: the right and left direction indicating positions and the neutral position, the inner surface of the housing is provided with a cam surface, and the operating lever is provided, through the intermediation of a spring, with a driving member to be engaged with the cam surface. Further, there is provided a cancel mechanism for automatically restoring the operating lever to the neutral position when the steering wheel is turned in a direction opposite to the indicated direction, with the operating lever rotated to the right or left direction indicating position.

A known conventional example of this cancel mechanism is disclosed in Japanese Patent Unexamined Application Publication U.S. Pat. No. 5,949,040, which was proposed by the present applicant. FIG. 9 is a cross sectional view schematically showing the construction of the turn signal switch device disclosed in the above-mentioned publication, FIG. 10 is a front view of a movable member provided in the turn signal switch device, and FIGS. 11A and 11B are schematic diagrams illustrating the operation of a cancel mechanism provided in the turn signal switch device.

In these drawings, numeral 100 indicates a housing. The housing 100 is secured to a column cover, a combination switch, etc. (not shown) which is a stator member of a steering device. On the inner bottom surface of the housing 100, a guide shaft 101 and a support shaft 102 are provided at a predetermined interval. The guide shaft 101 is fitted into a first elongated hole 103a of a first lever member 103, and a second lever member 104 is rotatably supported by the support shaft 102. The first lever member 103 has a second elongated hole 103b, into which a connection pin 104a provided on the second lever member 104 is fitted. Further, at the front and rear ends of the first lever member 103, there are provided an abutting portion 103c and a cam portion 103d, the cross sectional configuration of the cam portion 103d being semi-circular. The first lever member 103 is engaged with one arm of a torsion coil spring 105, by means of which the first lever member 103 is elastically biased in the longitudinal direction of the elongated holes 103a and 103b. A winding portion of the torsion coil spring 105 is inserted into a boss 106 provided on the inner bottom surface of the housing 100, and the other arm thereof is engaged with the side wall of the housing 100. Further, the second lever member 104 has a first opening 104b and a second opening 104c, and the openings 104b and 104c are opposed to each other through a support shaft 105.

An operating lever 107 is supported by the housing 100 such that it is rotable around a support shaft 108 in the directions indicated by the arrows A and B, and inside the housing 100, there is formed a V-shaped cam surface 109 having a pair of lock portions 109a on the right and left sides. A holder 110 is mounted to the operating lever 107, and the operating lever 107 and the holder 110 integrally rotate horizontally around a straight line connecting the support shafts 108. Inside a cylindrical portion 110a protruding on the front side of the holder 110, a driving member 111 is slidably held, and the forward end of this driving member 111 is constantly held in press contact with the cam surface 109 by a spring (not shown). Further, a movable member 115 is rotatably supported by the cylindrical portion 110a of the holder 110, and both arms of a return spring 116 wound around the movable member 115 are engaged with the holder 110, whereby the movable member 115 is constantly biased toward the central stable position. Further, a cam portion 112 having a semi-circular cross sectional configuration and a receiving portion 113 hang down from the movable member 115, and the cam portion 112 is opposed to the cam portion 103d of the first lever member 103, the receiving portion 113 reaching the interior of the second opening 104c of the second lever member 104.

In the turn signal switch device, constructed as described above, when the operating lever 107 is at the neutral position, the forward end of the driving member 111 abuts the central valley of the cam surface 109, and is stably held at the position by the elasticity of a spring (not shown). At this time, as shown in FIG. 11A, the cam portion 112 on the operating lever 107 side and the cam portion 103d of the first lever member 103 are in contact with each other at their apexes, and the first lever member 103 retracts against the biasing force of the torsion coil spring 105. Thus, the abutting portion 103c of the first lever 103 is positioned outside the rotation path of a cancel protrusion 114 rotating with the steering wheel; if the steering wheel is turned in this condition, the cancel protrusion 114 does not abut the abutting portion 103c of the first lever member 103, and the operating lever 107 is maintained at the neutral position.

When the operating lever 107 is rotated from this neutral position in the direction of the arrow A or the arrow B, the forward end of the driving member 111 moves over the slope of the cam surface 109 and is engaged with the lock portion 109a, and stably held at the position by the lock portion 109a. For example, when the operating lever 107 is rotated in the direction of the arrow B, the movable member 115 integrally rotates with that, and the cam portion 112 and the receiving portion 113 of the movable member 115 are displaced from the position shown in FIG. 11A to that shown in FIG. 11B. As a result, the cam portion 112 is detached from the apex of the cam portion 103d of the first lever member 103, and the first lever member 103 receives the elastic force of the torsion coil spring to advance along the longitudinal direction of the elongated holes 103a and 103b, the abutting portion 103c advancing into the rotation path of the cancel protrusion 114. Further, with the rotation in the direction of the arrow B of the operating lever 107, switching operation is effected on a contact (not shown), and the right-hand turn lamp blinks.

In the right-hand turn state shown in FIG. 11B, when the steering wheel is turned in the opposite direction (the direction of the arrow in the drawing), the cancel protrusion 114 abuts the abutting portion 103c of the first lever member 103 during the return operation. As a result, the first lever member 103 rotates clockwise as seen in the drawing around the guide shaft 101, and the torque is transmitted from the second elongated hole 103b to a second lever member 104 through a connection pin 104a, and the second lever member 104 rotates clockwise around the support shaft 102, so that the second opening 104C of the second lever member 104 is rotated and displaced upward as seen in the drawing. As a result, the periphery of the second opening 104C upwardly pressurizes the receiving portion 113 of the movable member 115, so that the driving member 111 is detached from the lock portion 109a of the cam surface 109 and moves toward the central valley, and the operating lever 107 and the first and second lever members 103 and 104 are automatically restored to the central position shown in FIG. 11A.

Further, in the right-hand turn state shown in FIG. 11B, when some force preventing the automatic restoration is applied to the operating lever 107, for example, when the steering wheel is turned in the opposite direction, with the operating lever 107 being pressed by the driver, the periphery of the second opening 104C upwardly pressurizes the receiving portion 113 of the movable member 115 as described above. However, the operating lever 107, which is being pressed, is not automatically restored. In this case, the movable member 115 rotates the peripheral surface of the cylindrical portion 110a of the holder 110 from the stable position to the retracted position against the biasing force of the return spring 116. And, when the cancel protrusion 114 passes the abutting portion 103c of the first lever member 103, the movable member 115 is automatically restored from the retracted position to the stable position by the biasing force of the return spring 116, so that it is maintained in the right-hand turn state shown in FIG. 11B again.

In the conventional turn signal switch device, constructed as described above, when some force preventing automatic restoration is applied to the operating lever 107 when automatically restoring the operating lever 107 from the operating position to the neutral position, an excess load generated between the second opening 104C of the second lever member 104 and the receiving portion 113 of the movable member 115 is released (absorbed) by the rotation of the movable member 115, so that it is possible to prevent breakage of the power transmission system including the first and second lever members 103 and 104 and the receiving portion 113. However, to install such a mechanism, it is necessary to provide the rotatable movable member 115 and the return spring 116 which elastically biases the movable member 115 toward the stable position, and the number of parts increases due to the movable member 115 and the return spring 116. Further, due to the mounting space for the movable member 115 and the return spring 116, the size of the turn signal switch device is enlarged.

SUMMARY OF THE INVENTION

In accordance with the present invention, a spring is provided between the driving member and the movable member, and it is possible to bring the driving member into press contact with the cam surface due to one repulsion of this spring, and to maintain the movable member at a stable position due to the other repulsion of the spring. In this construction, the spring, which is the component for maintaining the operating lever at the neutral position and the operating position, also serves as a return spring for the movable member required when releasing the excess load of the operating lever, so that it is possible to reduce the number of parts and to achieve a reduction in the mounting space.

In accordance with the present invention, there is provided a turn signal switch device comprising: a housing having a cam surface, an operating lever rotatably supported by the housing, a driving member cooperating with the cam surface to hold the operating lever at a neutral position and an operating position, a spring elastically biasing the driving member toward the cam surface, and a cancel lever abutting a cancel protrusion on a steering wheel side to be rotated, the operating lever being automatically restored from the operating position to the neutral position with the rotation of the cancel lever, wherein the operating lever is equipped with a movable member, which is held in a stable position by an elastic force from the spring, wherein the torque of the cancel lever is transmitted to the movable member held in the stable position, whereby the operating lever at the operating position is automatically restored to the neutral position, and wherein when an excess load preventing the operating lever from being automatically restored from the operating position to the neutral position is applied to the operating lever, the movable member is moved from the stable position to a retracted position against the elastic force of the spring, whereby the cancel lever is allowed to rotate.

In this construction, the spring, which is the component for maintaining the operating lever at the neutral position and the operating position, also serves as a return spring for the movable member required when releasing the excess load of the operating lever, so that it is possible to reduce the number of parts and achieve a reduction in the mounting space.

There is no particular restriction regarding the means for transmitting the torque of the cancel lever to the movable member. However, it is desirable to adopt a construction in which the receiving portion of the movable member is inserted into an opening provided in the cancel lever and in which the periphery of the opening abuts the receiving portion with the rotation of the cancel lever. In this case, if the periphery of the opening is inclined with respect to the rotating direction of the cancel lever when the periphery of the opening abuts the receiving portion, the receiving portion moves along this inclined periphery, whereby it is possible to smoothly release the excess load of the operating lever.

Further, when the operating lever is provided with a guide portion which guides the movable member in the moving direction of the driving member, it is possible to move the movable member smoothly to the retracted position when releasing the excess load.

Further, it is possible for the movable member to slide when releasing the excess load. However, when the movable member is swingably supported by the shaft portion of the operating lever, it is possible to make the requisite space for swinging the movable member smaller, and the operation of mounting the movable member can be easily conducted through snap engagement or the like. In this case, it is desirable to provide a shaft portion serving as the swinging fulcrum at one end of the movable member and to provide at the other end thereof a receiving portion to which the torque of the cancel lever is transmitted and, further, to provide between the shaft portion and the receiving portion a protrusion which is inserted into the spring.

DESCRIPTION OF THE PREFERRED EMBODIMENT

Figure 1:
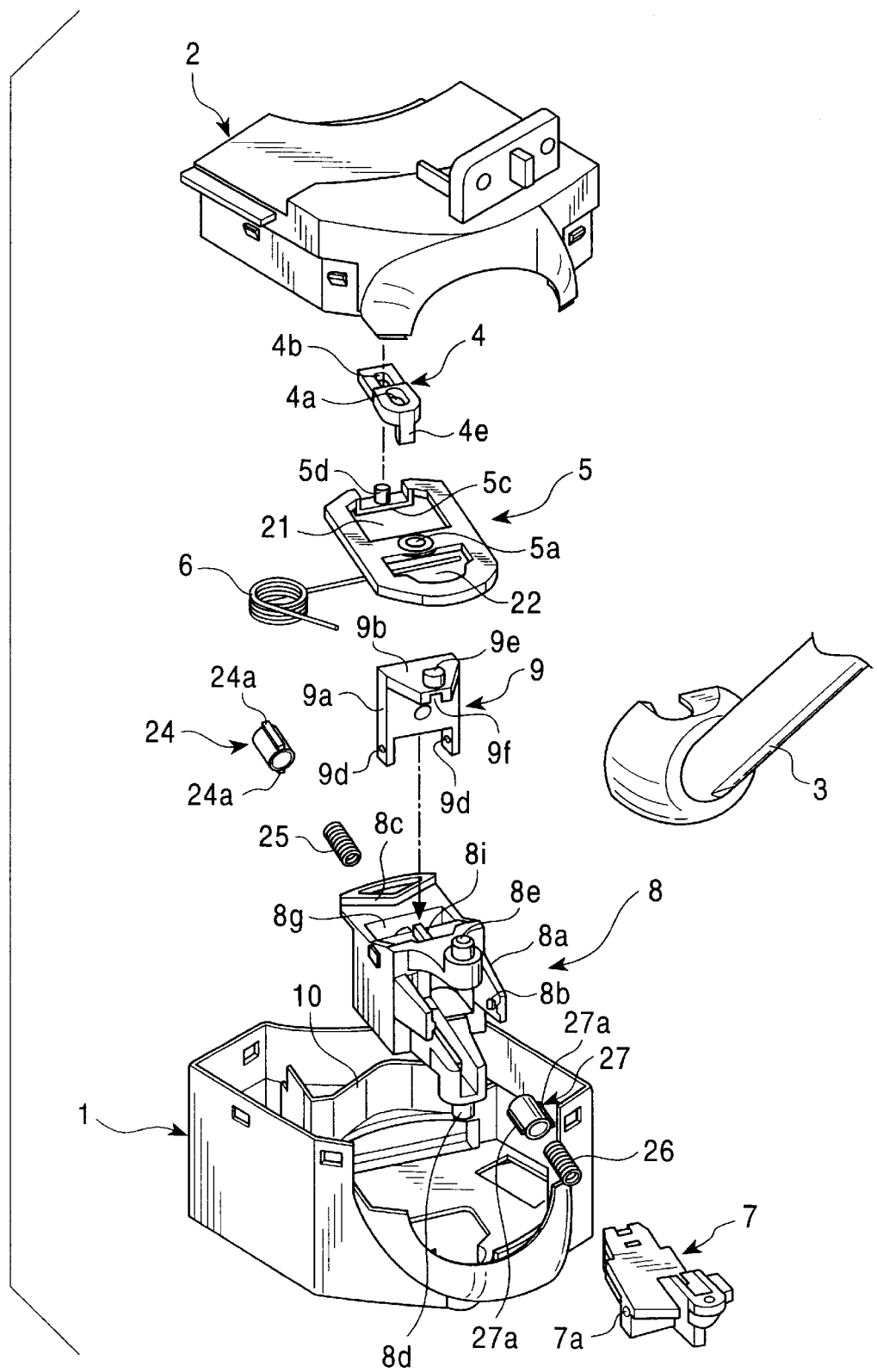
FIG. 1 is an exploded perspective view of a turn signal switch device according to an embodiment of the present invention.
Figure 6:
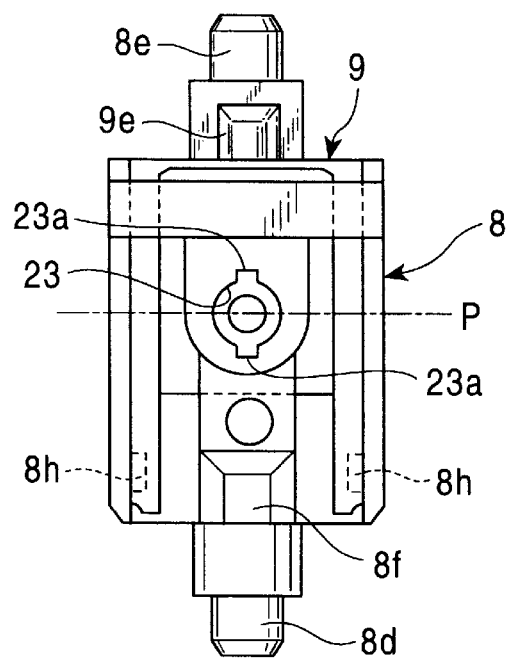
FIG. 6 is a front view showing a condition in which a movable member is incorporated into a holder.
Figure 7:
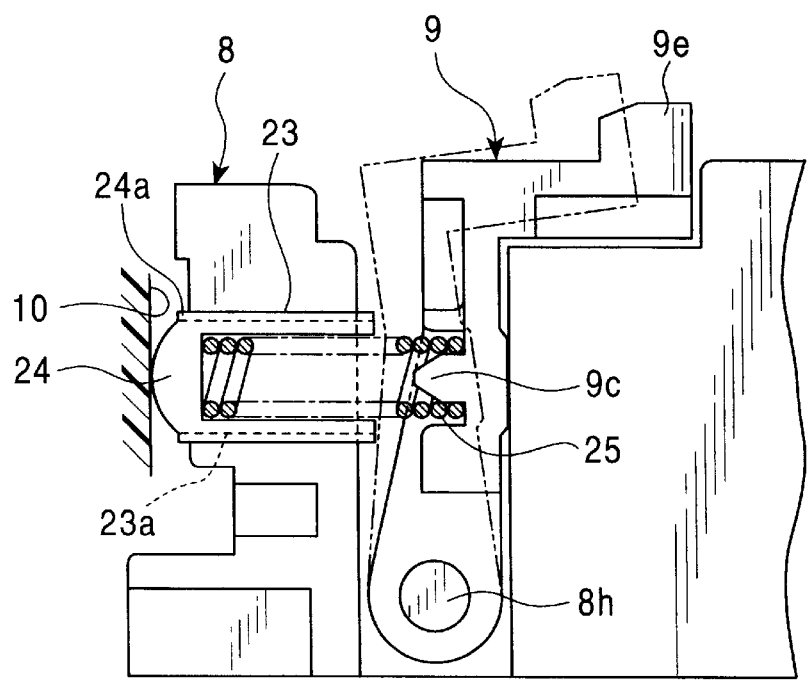
FIG. 7 is a diagram illustrating the operation of the movable member.
Figure 8A:
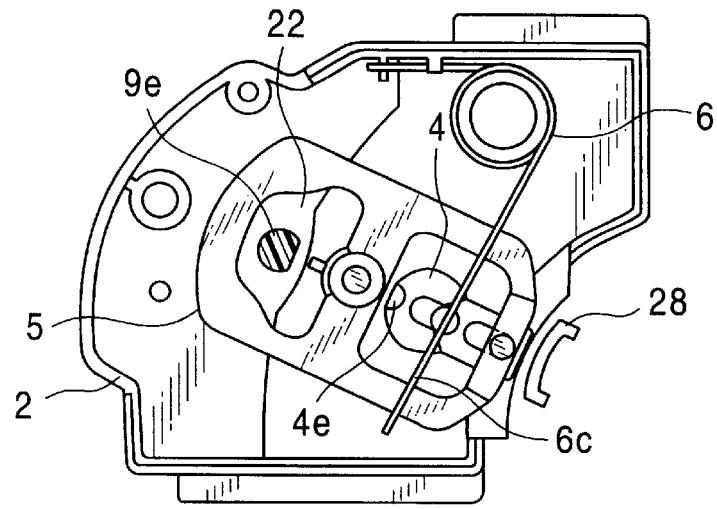
FIGS. 8A, 8B and 8C are schematic diagrams illustrating the operation of the cancel mechanism.
Figure 8B:
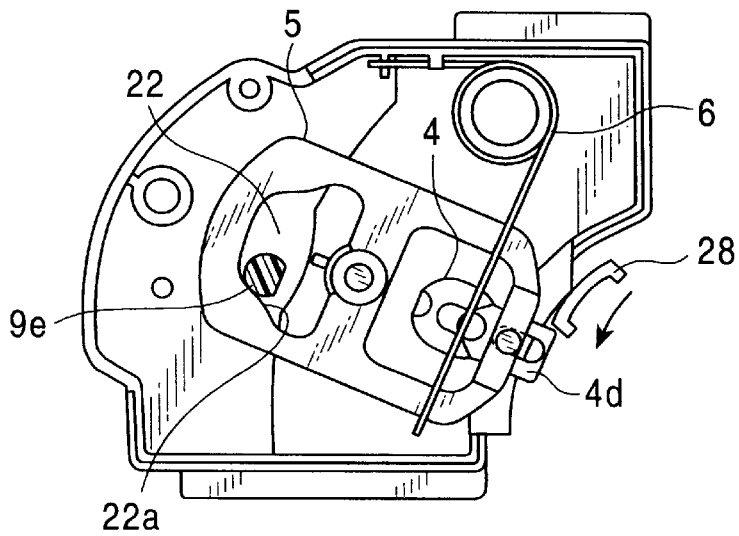
Figure 8C:
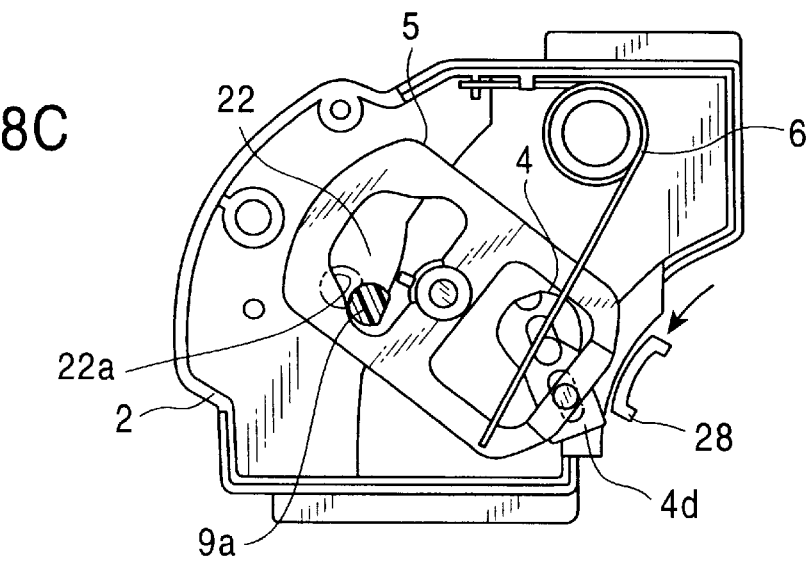
Figure 9:
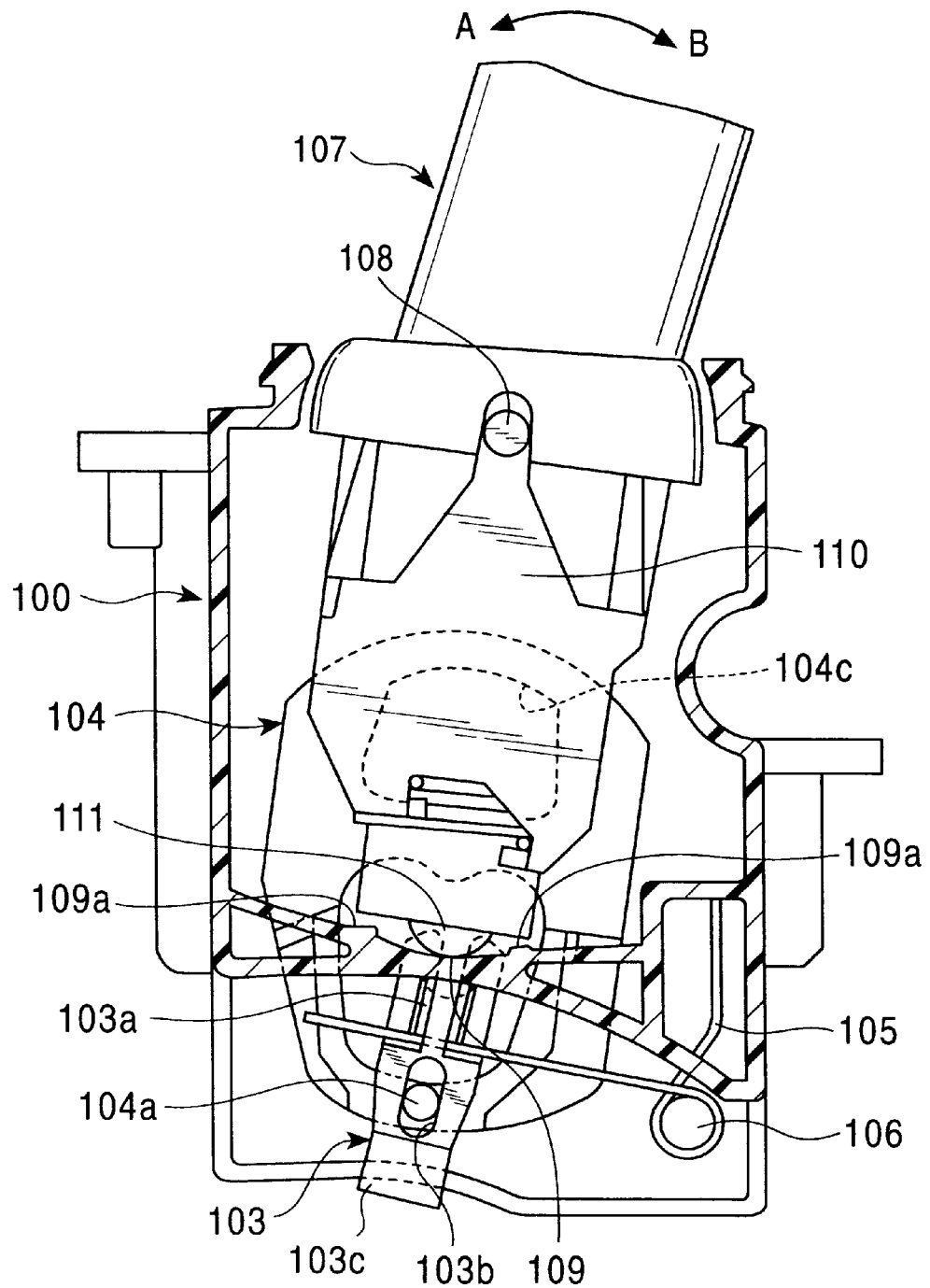
FIG. 9 is a cross sectional view of a conventional turn signal switch device.
Figure 10:
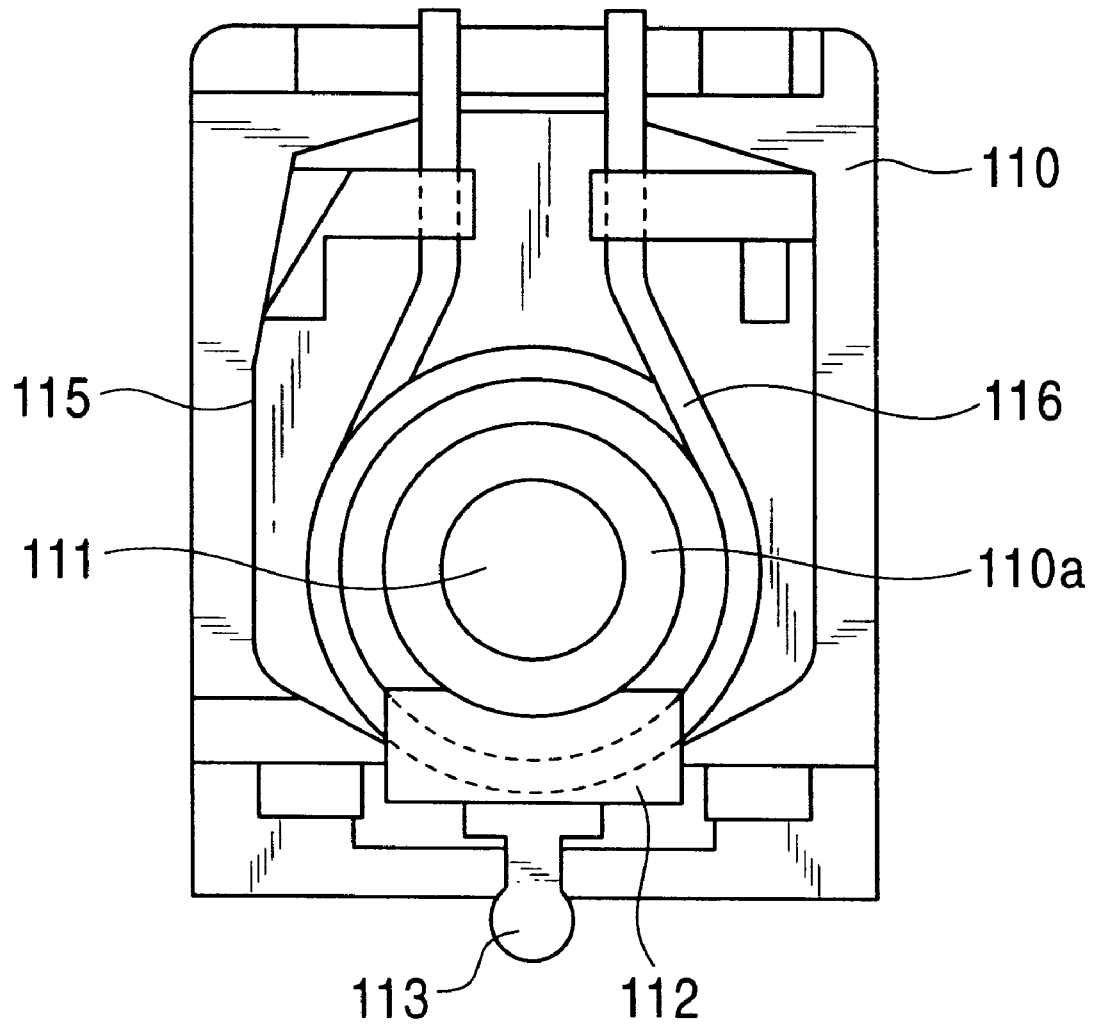
FIG. 10 is a front view of a movable member provided in the turn signal switch device.
Figure 11A:
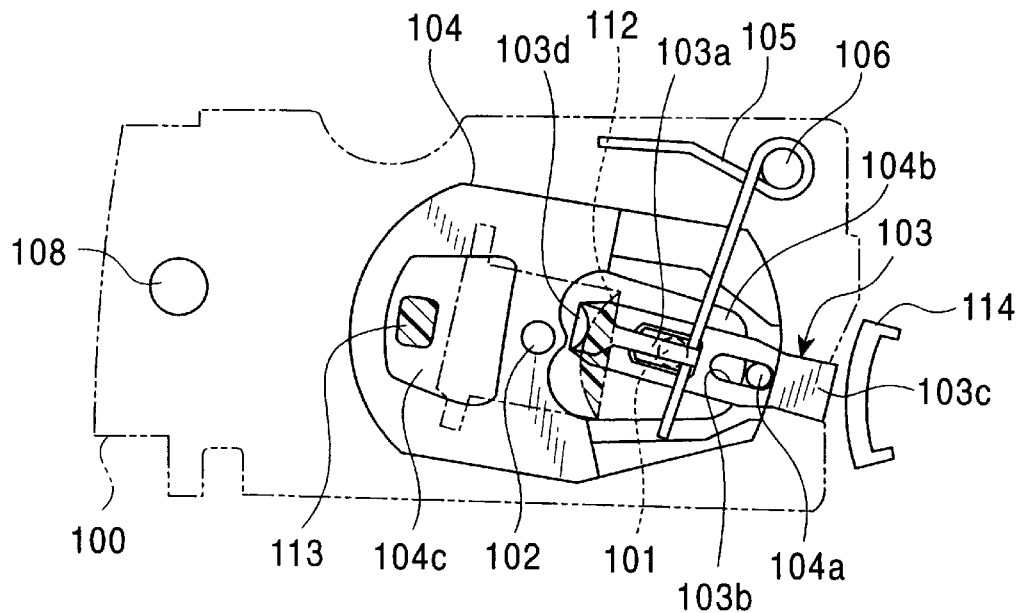
FIGS. 11A and 11B are diagrams illustrating the cancel operation of the turn signal switch device.
Figure 11B:
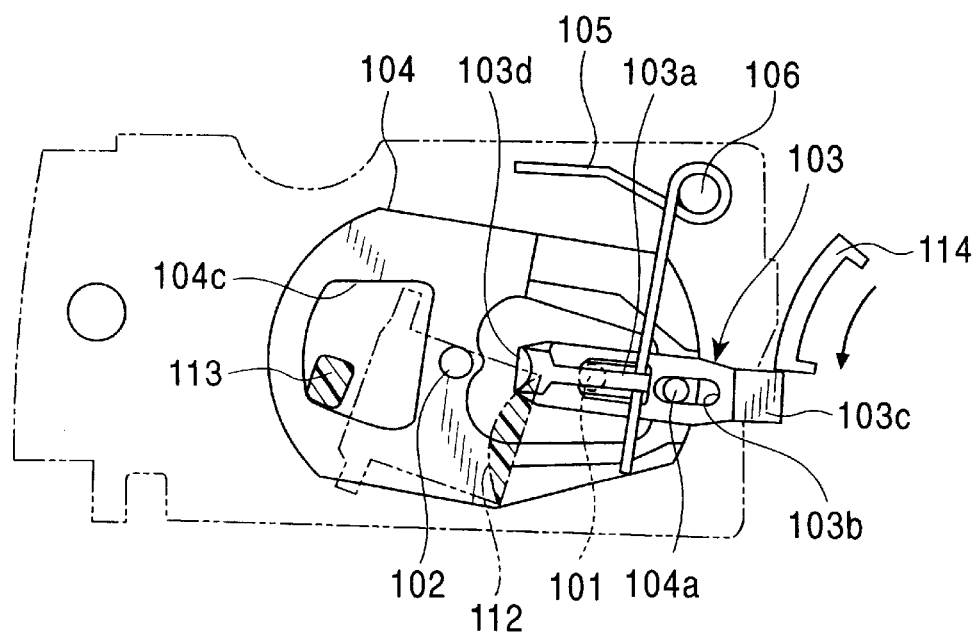

An embodiment will be described with reference to the drawings. FIG. 1 is an exploded perspective view of a turn signal switch device according to the embodiment, FIG. 2 is a plan view showing a condition in which an operating lever is incorporated into a first case, FIG. 3 is a longitudinal sectional view of the turns signal switch device, FIG. 4 is an exploded perspective view showing a main portion of a cancel mechanism, FIG. 5 is a bottom view of the cancel mechanism, FIG. 6 is a front view showing a condition in which a movable member is incorporated into a holder, FIG. 7 is a schematic diagram illustrating the operation of the movable member, and FIGS. 8A, 8B and 8C are schematic diagrams illustrating the operation of the cancel mechanism.

A turn signal switch device according to this embodiment mainly comprises first and second cases 1 and 2 of synthetic resin constituting a housing, an operating lever 3 rotatably supported by the cases 1 and 2, first and second lever members 4 and 5 placed on the inner surface of the second case 2, and a torsion coil spring 6 elastically biasing the first lever member 4 such that it protrudes from the second case 2. As described below, the operating lever 3 is equipped with an operating member 7, a holder 8, a movable member 9, etc. The first and second cases 1 and 2 are formed into an integral unit by snap engagement or the like, and secured to a stator member such as a column cover and a combination switch (not shown).

Figure 2:
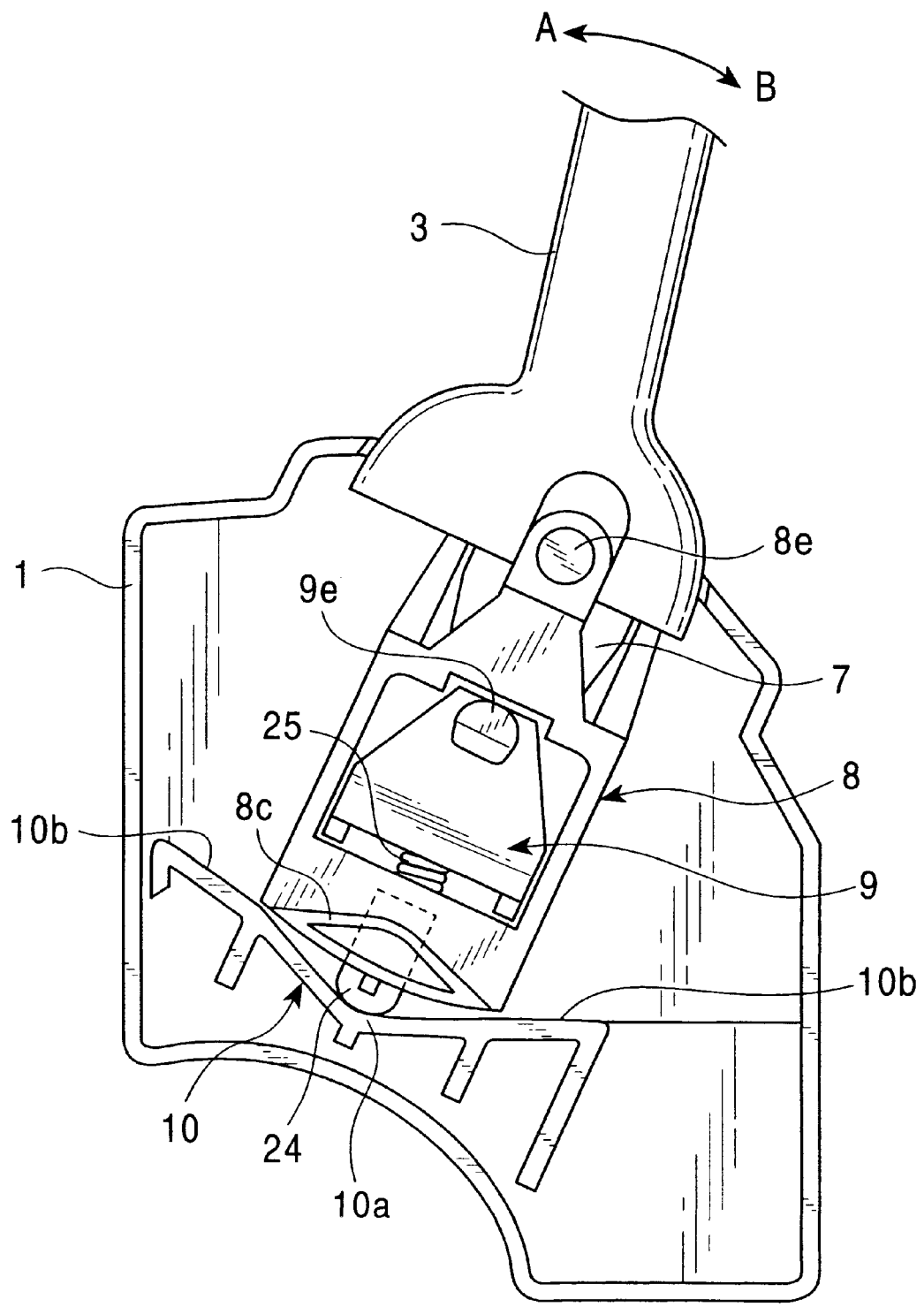
FIG. 2 is a plan view showing the condition in which an operating lever is incorporated into a first case.
Figure 3:
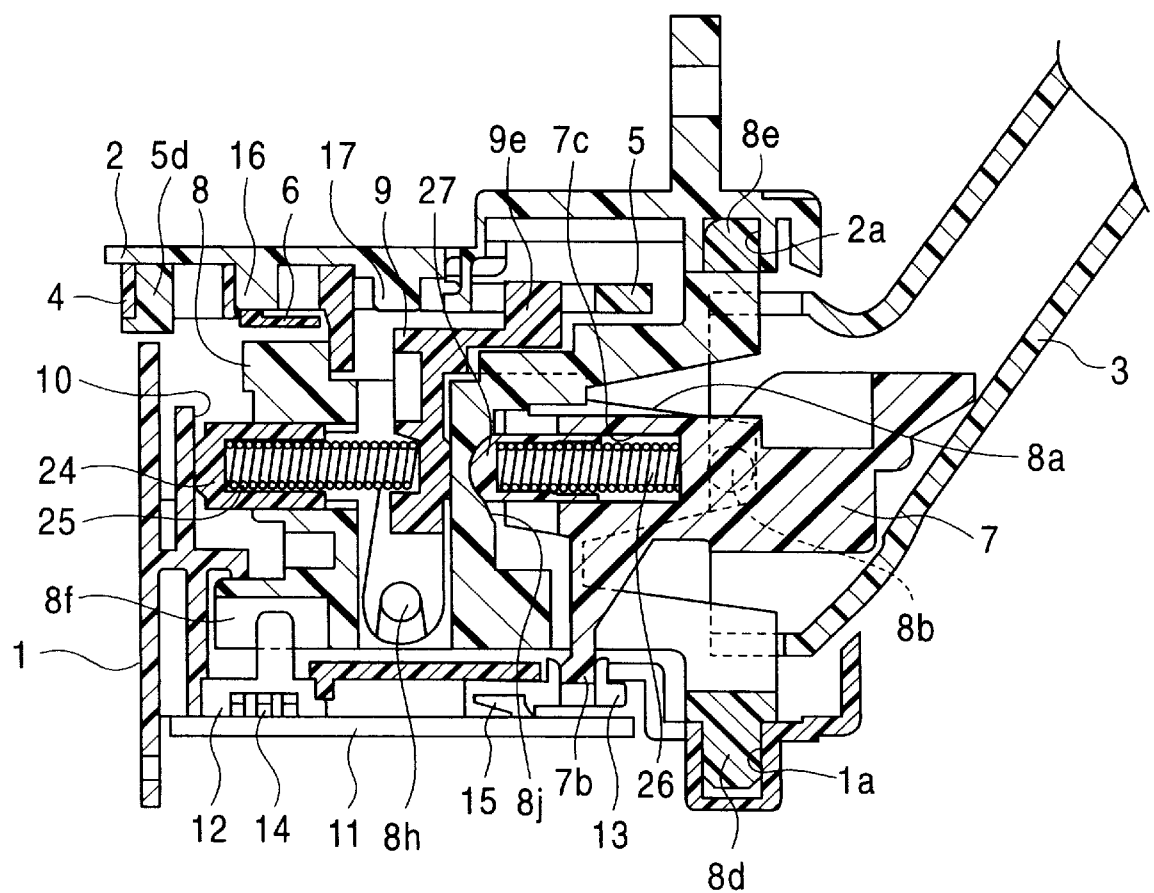
FIG. 3 is a longitudinal sectional view of the turn signal switch device.

As shown in FIGS. 1 and 2, inside the first case 1, there is formed a V-shaped cam surface 10, which has a central valley portion 10a and a pair of lock portions 10b positioned on either side. As shown in FIG. 3, a printed board 11 is mounted to the bottom surface of the first case 1, and a pair of slider receiving members 12 and 13 sliding on the printed board 11 are exposed on the inner bottom surface of the first case 1. One slider receiving member 12 is driven by rotating the operating lever in a left-hand or right-hand turn direction, causing a left-hand or right-hand turn lamp (not shown) to blink. The other slider receiving member 13 is driven by swinging the operating lever 3 vertically, lighting a beam lamp (not shown). Mounted to the slider receiving members 12 and 13 are movable contacts 14 and 15 which are brought into contact with and separated from a stationary contact (not shown) formed on the printed board 11.

Figure 4:
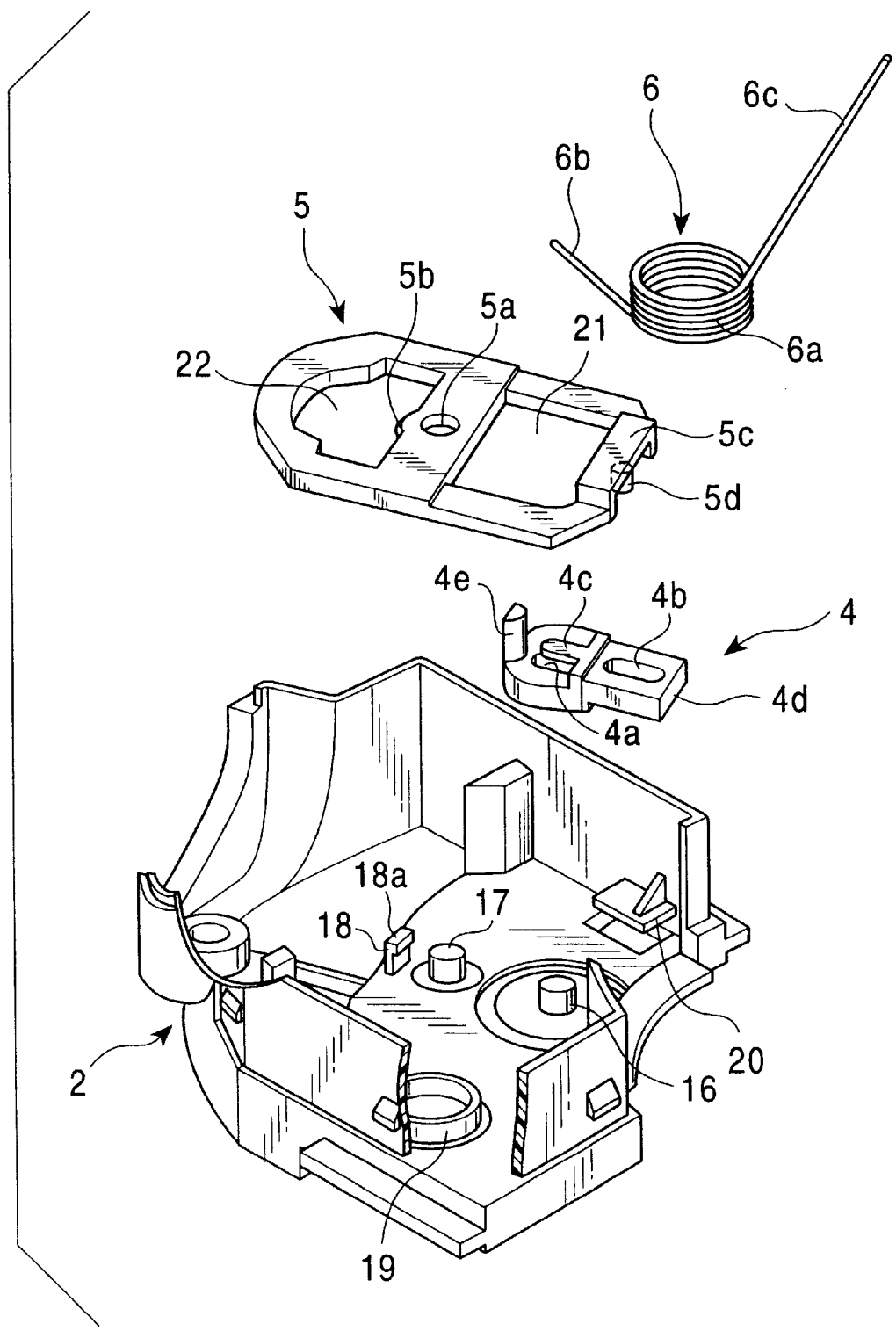
FIG. 4 is an exploded perspective view showing a main portion of a cancel mechanism.
Figure 5:
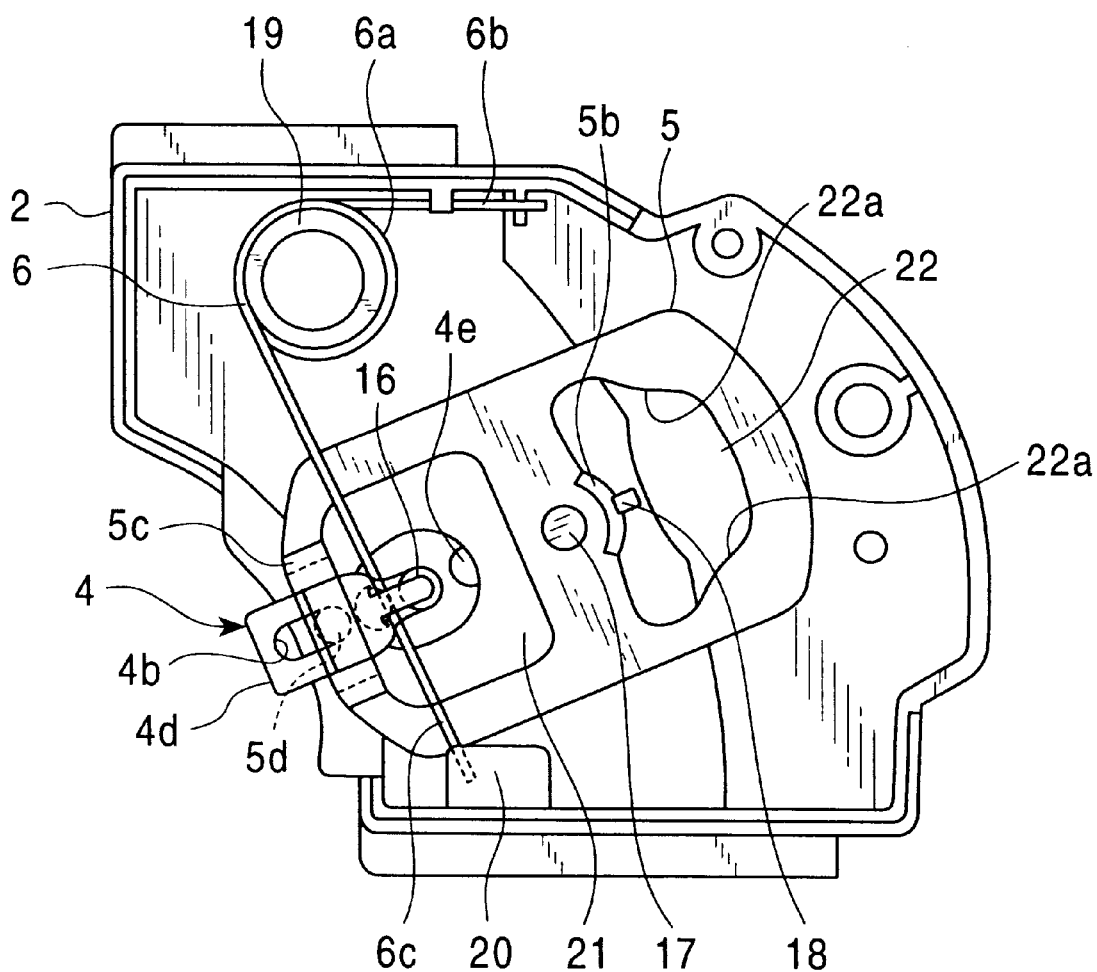
FIG. 5 is a bottom view of the cancel mechanism.

As shown in FIGS. 4 and 5, on the inner surface of the second case 2, there are provided cylindrical guide shaft 16 and a support shaft 17 at a predetermined interval in the same line, and a snap member 18 having an engagement claw 18a at its forward end is provided in the vicinity of the support shaft 17. Further, on the inner surface of the second case 2, there is provided a cylindrical boss 19, and on the side surface opposite to this boss 19, there is provided a restriction surface 20 extending in parallel with the inner surface of the second case 2.

Formed in the first lever member 4 are first and second elongated holes 4a and 4b and a spring receiving portion 4c. The spring receiving portion 4c extends along one opening end of the first elongated hole 4a. A guide shaft 16 is inserted into the first elongated hole 4a, and the first lever member 4 is rotatable and slidable along the guide shaft 16. Further, an abutting portion 4d and a cam portion 4e protrude from the front and rear ends of the first lever member 4, and the cross sectional configuration of the cam portion 4 is semicircular.

Formed in the second lever member 5 are a first opening 21 and a second opening 22, the side edges of the second opening 22 constituting curved portions 22a inwardly protruding. Further, formed in the second lever member 2 is a hole 5a into which a support shaft 17 is inserted, the second lever member 5 being rotatable around the support shaft 17. Formed in the vicinity of the hole 5a is a recess 5b which is engaged with the engagement claw 18a of the snap member 18, the recess 5b extending arcuately around the hole 5a. Further, formed at the forward end of the second lever member 5 is a protrusion 5c, at the center of which a connection pin 5d is provided.

The second lever member 5 is superimposed on the first lever member 4 with respect to the inner surface of the second case 2, and the forward end portion of the first lever member 4 including the second elongated hole 4b is accommodated between the inner surface of the second case 2 and the protrusion 5c of the second lever member 5. Further, the rear end portion of the first lever member 4 including the cam portion 4e and the spring receiving portion 4c protrudes from the first opening 21 of the second lever member 5 toward the first case 1, and the first lever member 4 is elastically biased in the longitudinal direction of the elongated holes 4a and 4b by a torsion coil spring 6. The torsion coil spring 6 has a winding portion 6a inserted into the boss 19, a first arm portion 6b engaged with the side wall of the second case 2, and a second arm portion 6c extending in a cantilever-like fashion using the winding portion 6a as the stationary end, substantially the central portion of the second arm portion 6c being engaged with the spring receiving potion 4c of the first lever member 4. Further, the forward end portion of the second arm portion 6c is slidably in contact with the restriction surface 20 of the second case 2. By this restriction surface 20, the second arm portion 6c is prevented from being separated from the inner surface of the second case 2. That is, in addition to the function by which it elastically biases the first lever member 4 in the longitudinal direction of the elongated holes 4a and 4b, the second arm portion 6c of the torsion coil spring 6 serves as a detachment preventing member preventing the elongated hole 4a of the first lever member 4 from being detached from the guide shaft 16.

When incorporating the lever members 4 and 5 into the second case 2, the guide shaft 16 is first inserted into the first elongated hole 4a of the first lever member 4, and then the support shaft 17 is inserted into the hole 5a, with the protrusion 5c of the second lever member 5 being superimposed on the first lever member 4, whereby the connection pin 5d of the second lever member 5 is inserted into the second elongated hole 4b of the first lever member 4, and the engagement claw 18a of the snap member 18 is engaged with the recess 5b of the second lever member 5. After this, the second arm portion 6c of the torsion coil spring 6 is engaged with the spring receiving portion 4c of the first lever member 4 while deflecting it, and the forward end of the second arm portion 6c is brought into contact with the restriction surface 20, whereby the lever members 4 and 5 are placed between the inner surface of the second case 2 and the second arm portion 6c. As a result, even if a force which tends to separate the lever members from the inner surface of the second case 2, this force is received by the second arm portion 6c, so that it is possible to prevent the first elongated hole 4a of the first lever member 4 from being detached from the guide shaft 16, and it is also possible to prevent the hole 5a of the second lever member 5 superimposed on the first lever member 4 from being detached from the support shaft 17.

As described above, the operating lever 3 is equipped with the operating member 7, the holder 8, the movable member, etc., the operating member 7, the holder 8 and the movable member 9 being formed of synthetic resin. As shown in FIG. 3, the rear end of the operating member 7 is secured to the base portion of the operating lever 3, and a circular recess 7a is formed in either side surface thereof. Further, a protrusion 7b is formed at the lower end of the operating member 7, the protrusion 7b being engaged with the other slider receiving member 13 described above.

The holder 8 has protruding members 8a extending rearward from both side surfaces, and circular protrusions 8b formed in the protruding members 8a are snapped in the recesses 7a of the operating member 7. At the forward end of the upper surface of the holder 8, there is formed a cam surface 8c of angle section in plan view, and this cam surface 8c is opposed to the cam portion 4e of the first lever member 4. Further, a pair of support shafts 8d and 8e protrude from the upper and lower surfaces of the holder 8, and the support shafts 8d and 8e are fitted into circular recesses 1a and 2a formed in the first and second cases 1 and 2. Further, at the forward lower end of the holder 8, there is formed a protrusion 8f, which is engaged with the one slider receiving member 12 described above.

The movable member 9 has a leg portion 9a and a driving portion 9b, which are connected together in an L-shaped fashion, the leg portion 9a being inserted from above into an opening 8g formed in the holder 8. The leg portion 9a has a spring receiving protrusion 9c and a pair of shaft holes 9d. By snap-engaging these shaft holes 9d with protrusions 8h formed in the opening 8g of the holder 8, the movable member 9 is swingably supported by the holder 8. The driving portion 9b extends rearward along the upper surface of the holder 8, and at the rear end of the driving portion 9b, there protrudes a receiving portion 9e which reaches the interior of the second opening 22 of the second lever member 5. Further, a guide groove 9f is formed at the center of the back surface of the driving portion 9b, and a protrusion 8i formed on the upper surface of the holder 8 is inserted into this guide groove 9f, whereby play of the movable member 9 at the time of swinging is prevented.

As shown in FIGS. 6 and 7, an insertion hole 23 is formed at the forward end of the holder 8, and a first driving member 24 of synthetic resin is slidably held in this insertion hole 23. A spring 25 is provided between the first driving member 24 and the spring receiving protrusion 9c of the movable member 9, and due to the repulsive force of this spring 25, the forward end of the first driving member 24 is brought into press contact with the cam surface 10 of the first case 1, the leg portion 9a of the movable member being held in press contact with the inner surface of the holder 8 to be held at a stable position. At the upper and lower ends of the insertion hole 23, there are formed a pair of guide grooves 23a extending in the axial direction, and these guide grooves 23a are positioned in a plane perpendicular to the sliding direction (indicated by a straight line P in FIG. 6) of the first driving member moving in the cam surface 10. On the other hand, a pair of guide protrusions 24a extending in the axial direction are formed in the outer peripheral surface of the first driving member 24, and these guide protrusions 24a slide in the guide grooves 23a, keeping a minute clearance.

As described above, the operating member 7 and the holder 8 secured to the operating lever 3 are rotatably connected together at the fitting engagement portion of the recess 7a and the protrusion 8b, and the holder 8 and the cases 1 and 2 are rotatably connected together at the fitting engagement portion of the support shafts 8d and 8e and the recesses 1a and 2a. Thus, when the operating lever 3 is turned to a right-hand or left-hand turn indicating position, the operating lever 3, the operating member 7 and the holder 8 integrally rotate horizontally with respect to the housing (the cases 1 and 2) around a straight line connecting the recesses 1a and 2a (the support shafts 8d and 8e); when the operating lever 3 is rotated in a direction perpendicular to the indicating position of the operating lever 3, the operating lever 3 and the operating member 7 rotate vertically by a predetermined angle with respect to the housing and the holder 8 around a straight line connecting the recesses 7a (the protrusions 8b). As shown in FIG. 3, in the insertion hole 7c formed at the forward end of the operating member 7, a second driving member 27 is slidably held through a spring 26, and the forward end of the second driving member 27 is held in press contact with a cam surface 8j formed in the interior of the holder 8. Though not shown in detail, a guide groove and a guide similar to those formed in the insertion hole 23 and the first driving member 24 are formed in the insertion hole 7c and the second driving member 27. However, the sliding direction of the second driving member 27 moving on the cam surface 8j is perpendicular to the first driving member 24, so that, as shown in FIG. 1, the guide protrusion 24a of the first driving member 24 is perpendicular to the guide protrusion 27a of the second driving member 27.

Next, the operation of the turn signal switch device, constructed as described above, will be described mainly with reference to FIGS. 8A, 8B and 8C. In FIGS. 8A, 8B and 8C, the lever members 4 and 5 and the torsion coil spring 6 are shown through from above the second case 2.

First, as shown in FIG. 2, when the operating lever is at the neutral position, the forward end of the first driving member 24 abuts the valley portion 10a at the center of the cam surface 10, and stably held at the position by the elastic force of the spring 25. At this time, cam portion 4e of the first lever 4 abuts the apex of the cam surface 8c of the holder 8. As shown in FIG. 8A, the first lever member 4 is retracted against the biasing force of the torsion coil spring 6. Thus, the abutting portion 4d of the first lever member 4 is positioned outside the rotation path of the cancel protrusion 28 rotating with the steering wheel. If the steering wheel is turned in this condition, the cancel protrusion 28 does not abut the abutting portion 4d of the first lever member 4, and the operating lever 3 is maintained at the neutral position.

When the operating lever 3 is rotated from this neutral position in the direction of the arrow A or B, the forward end of the first driving member 24 slides on the cam surface 10 and is engaged with the lock portion 10b, and a click feel is generated when it goes over the slope of the cam surface 10. In this case, a narrow guide protrusion 24a and the guide groove 23a are in fitting engagement in a plane perpendicular to the sliding direction of the first driving member 24 (the straight line P in FIG. 6), so that the first driving member 24 slides in the insertion hole 23 without involving any play, and the outer size of the first driving member 24 is substantially as large as the inner size of the insertion hole 23, and the forward end of the first driving member 24 smoothly slides on the cam surface 10, so that the operational feeling of the operating lever 3 is very satisfactory.

When, for example, the operating lever 3 is rotated in the direction of the arrow B in FIG. 2, the holder 8 and the movable member 9 also rotate in the same direction with the operating lever 3, and, with that, the apex of the cam surface 8c is detached from the cam portion 4e, so that, as shown in FIG. 8B, the first lever member 4 receives elastic force from the second arm portion 6c of the torsion coil spring 6 to advance in the longitudinal direction of the elongated holes 4a and 4b, and the abutting portion 4d comes into the rotation path of the cancel protrusion 28. At this time, the forward end portion of the second arm portion 6c slides along the restriction surface 20 of the second case 2, so that the forward end portion of the second arm portion 6c is not detached from the restriction surface 20. Further, with the rotation of the operating lever 3 in the direction of the arrow B, the receiving portion 9e of the movable member 9 is displaced in the second opening 22 of the second lever member 5, and, as shown in FIG. 8B, this receiving portion 9e abuts one curved portion 22 of the second opening 22. Further, with the rotation of the operating lever 3 in the direction of the arrow B, the protrusion 8f of the holder 8 drives one slider receiving member 12, so that the switching of the contact is effected by this slider receiving member 12, and a right-hand turn lamp (not shown) blinks.

In the right-hand turn state shown in FIG. 8B, when the steering wheel is turned in the opposite direction (in the direction of the arrow in the drawing), the cancel protrusion 28 abuts the abutting portion 4d of the first lever member 4 during the return operation. As a result, the first lever member 4 rotates clockwise as seen in the drawing around the guide shaft 17, and, with that, the second lever member 5 connected to the first lever member 4 rotates clockwise around the support shaft 17, so that the second opening 22 of the second lever member 5 is upwardly rotated and displaced, whereby the curved portion 22a of the second opening 22 pressurizes the receiving portion 9e of the movable member 9 upward, and this pressurizing force is transmitted to the holder 8 through the movable member 9, so that the forward end of the first driving member held by the holder 8 is detached from the lock portion 10b of the cam surface 10 and moves to the central valley portion 10a, and the operating lever 3 and the first and second lever members 4 and 5 are automatically restored to the neutral position shown in FIG. 8A.

Further, when in the right-hand turn state shown in FIG. 8B there is applied to the operating lever 3 some force which prevents its automatic restoration, if, for example, the steering wheel is turned in the opposite direction while pressing the operating lever 3, the second lever member 5 tends to rotate clockwise around the support shaft 17; since, however, the operating lever 3 is pressed, the holder 8 does not rotate, and an excess load is generated at the abutting portion of the curved portion 22a of the second opening 22 and the receiving portion 9e of the movable member 9. When such an excess load is generated, the receiving portion 9e is pressed along the curved portion 22a by a component force in the rotating direction of the second lever member 5 as shown in FIG. 8C, and the movable member 9 swings from the stable position indicated by the solid line in FIG. 7 to the retracted position indicated by the two-dot chain line against the repulsive force of the spring 25, so that the first and second lever members 5 can rotate without being prevented by the receiving portion 9e. And, when the cancel protrusion 28 passes the abutting portion 4d of the first lever member 4, the movable member 9 is automatically restored from the retracted position to the stable position by the repulsive force of the spring 25, so that it is again maintained in the right-hand turn state shown in FIG. 8B. In this way, the excess load generated at the abutting portion of the second opening 22 of the second lever member 5 and the receiving portion 9e of the movable member 9 during the cancel operation is released (absorbed) by the swinging of the movable member 9, so that it is possible to prevent breakage of the components of the power transmission system including the levers 4 and 5 and the movable member 9.

On the other hand, when the operating lever 3 is rotated in a direction perpendicular to the indicating position (the direction perpendicular to the arrows A and B in FIG. 2), the operating lever 3 and the operating member 7 rotate vertically by a predetermined angle with respect to the housing (the cases 1 and 2) and the holder 8 around a straight line connecting the recesses 7a (the protrusions 8b), and with that, the forward end of the second driving member 27 slides on the cam surface 8j of the holder 8, and a click feel is generated when it goes over the slope of the cam surface 8j. In this case also, play of the second driving member 27 is restrained due to the fitting engagement of the guide protrusion and the guide groove, and the forward end of the second driving member 27 smoothly slides on the cam surface 8j, so that the operational feeling of the operating lever 3 is very satisfactory. Further, with the rotation of the operating lever 3, the protrusion 7b of the operating member 7 drives the slider receiving member 13, so that the switching of the contact is effected by this slider receiving member 13, and beam switching and passing operations are conducted.

In the above-described embodiment, the excess load generated at the abutting portion of the second opening 22 of the second lever member 5 and the receiving portion 9e of the movable member 9 during the cancel operation is released (absorbed) by the swinging of the movable member 9, so that it is possible to prevent breakage of the components of the power transmission system including the lever members 4 and 5 and the movable member 9. Further, as a return spring for elastically biasing the movable member 9 toward the stable position, the repulsive force of the spring 25 bringing the first driving member 24 into press contact with the cam surface 10 of the first case is utilized, so that it is possible to reduce the number of parts and to achieve a reduction in the mounting space.

Further, since the movable member 9 is swingably supported by the holder 8, it is possible to make the requisite space for swinging the movable member 9 small, and the operation of mounting the movable member 9 can be easily conducted through snap engagement or the like. Further, since the play at the time of the swinging of the movable member 9 is prevented by the fitting engagement of the guide groove 9f and the protrusion 8i, it is possible to move the movable member 9 smoothly to the retracted position when releasing the excess load.

The present invention, embodied as described above, provides the following advantages.

In accordance with the present invention, there is provided a turn signal switch device comprising: a housing having a cam surface, an operating lever rotatably supported by the housing, a driving member cooperating with the cam surface to hold the operating lever at a neutral position and an operating position, a spring elastically biasing the driving member toward the cam surface, and a cancel lever abutting a cancel protrusion on a steering wheel side to be rotated, the operating lever being automatically restored from the operating position to the neutral position with the rotation of the cancel lever, wherein the operating lever is equipped with a movable member, which is held in a stable position by an elastic force from the spring, wherein the torque of the cancel lever is transmitted to the movable member held in the stable position, whereby the operating lever at the operating position is automatically restored to the neutral position, and wherein when an excess load preventing the operating lever from being automatically restored from the operating position to the neutral position is applied to the operating lever, the movable member is moved from the stable position to a retracted position against the elastic force of the spring, whereby the cancel lever is allowed to rotate. In this construction, the spring, which is a component for retaining the operating lever at the neutral position and the operating position, also serves as a return spring for the movable member which is required when releasing the excess load of the operating lever, so that it is possible to reduce the number of parts and to achieve a reduction in the mounting space.

Further, the receiving portion of the movable member is inserted into the opening provided in the cancel lever, and when the periphery of the opening abuts the receiving portion with the rotation of the cancel lever, the periphery of the opening is inclined with respect to the rotating direction of the cancel lever, whereby it is possible to smoothly release the excess load of the operating lever through the movement of the receiving portion along the inclined periphery.

Further, when the operating lever is provided with a guide portion for guiding the movable member in the moving direction of the driving member, it is possible to smoothly move the movable member to the retracted position when releasing the excess load.

Further, when the movable member is swingably supported by the shaft portion of the operating lever, it is possible to make the requisite space for the swinging of the movable member small, and the operation of mounting the movable member can be easily effected through snap engagement or the like. In this case, it is desirable to provide a shaft portion serving as a swinging fulcrum at one end of the movable member, provide at the other end thereof a receiving portion to which the torque of the cancel lever is transmitted, and provide between the shaft portion and the receiving portion a protrusion which is inserted into a spring.

What is claimed is:

1. A turn signal switch device comprising: a housing having a cam surface, an operating lever rotatably supported by the housing, a driving member cooperating with the cam surface to hold the operating lever at a neutral position and an operating position, a spring elastically biasing the driving member toward the cam surface, and a cancel lever abutting a cancel protrusion on a steering wheel side to be rotated, the operating lever being automatically restored from the operating position to the neutral position with the rotation of the cancel lever, wherein the operating lever is equipped with a movable member, which is held in a stable position by an elastic force from the spring, wherein the torque of the cancel lever is transmitted to the movable member held in the stable position, whereby the operating lever at the operating position is automatically restored to the neutral position, and wherein when an excess load preventing the operating lever from being automatically restored from the operating position to the neutral position is applied to the operating lever, the movable member is moved from the stable position to a retracted position against the elastic force of the spring, whereby the cancel lever is allowed to rotate.

2. A turn signal switch device according to claim 1, wherein the movable member is equipped with a receiving portion to which the torque of the cancel lever is transmitted, and wherein the cancel lever is equipped with an opening into which the receiving portion is inserted.

3. A turn signal switch device according to claim 2, wherein the operating lever is equipped with a guide portion which guides the movable member in the moving direction of the driving member.

4. A turn signal switch device according to claim 3, wherein the movable member is swingably supported by the operating lever.

5. A turn signal switch device according to claim 4, wherein a shaft portion serving as a swinging fulcrum is provided at one end of the movable member, and wherein a receiving portion to which the torque of the cancel lever is transmitted is provided at the other end of the movable member, there being provided between the shaft portion and the receiving portion a protrusion which is inserted into the spring.

6. A turn signal switch device according to claim 2, wherein the movable member is swingably supported by the operating lever.

7. A turn signal switch device according to claim 6, wherein a shaft portion serving as a swinging fulcrum is provided at one end of the movable member, and wherein a receiving portion to which the torque of the cancel lever is transmitted is provided at the other end of the movable member, there being provided between the shaft portion and the receiving portion a protrusion which is inserted into the spring.

8. A turn signal switch device according to claim 1, wherein the operating lever is equipped with a guide portion which guides the movable member in the moving direction of the driving member.

9. A turn signal switch device according to claim 8, wherein the movable member is swingably supported by the operating lever.

10. A turn signal switch device according to claim 9, wherein a shaft portion serving as a swinging fulcrum is provided at one end of the movable member, and wherein a receiving portion to which the torque of the cancel lever is transmitted is provided at the other end of the movable member, there being provided between the shaft portion and the receiving portion a protrusion which is inserted into the spring.

11. A turn signal switch device according to claim 1, wherein the movable member is swingably supported by the operating lever.

12. A turn signal switch device according to claim 11, wherein a shaft portion serving as a swinging fulcrum is provided at one end of the movable member, and wherein a receiving portion to which the torque of the cancel lever is transmitted is provided at the other end of the movable member, there being provided between the shaft portion and the receiving portion a protrusion which is inserted into the spring.

* * * * *